US007292845B2

(12) United States Patent
Flannery

(10) Patent No.: US 7,292,845 B2
(45) Date of Patent: Nov. 6, 2007

(54) CELL PHONE HAVING LOCAL WIRELESS CONFERENCE CALL CAPABILITIES

(75) Inventor: Michael R. Flannery, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 1058 days.

(21) Appl. No.: 10/001,505

(22) Filed: Nov. 15, 2001

(65) Prior Publication Data

US 2003/0092433 A1 May 15, 2003

(51) Int. Cl.
*H04M 3/42* (2006.01)
(52) U.S. Cl. .................. 455/416; 429/13; 455/466; 455/552.1
(58) Field of Classification Search ............ 455/414.1, 455/414.2, 414.3, 416, 426, 434, 466, 552.1, 455/403; 429/13
See application file for complete search history.

(56) References Cited

U.S. PATENT DOCUMENTS

| | | | |
|---|---|---|---|
| 5,524,110 A | 6/1996 | Danneels et al. | |
| 6,100,882 A | 8/2000 | Sharman et al. | |
| 6,163,692 A | 12/2000 | Chakrabarti et al. | |
| 6,275,700 B1* | 8/2001 | Takahashi | 455/434 |
| 6,405,027 B1* | 6/2002 | Bell | 455/403 |
| 6,658,264 B1* | 12/2003 | Irvin | 455/552.1 |
| 6,856,809 B2* | 2/2005 | Fostick | 455/466 |
| 2001/0049283 A1* | 12/2001 | Thomas | 455/426 |
| 2003/0044654 A1* | 3/2003 | Holt | 429/13 |
| 2003/0073430 A1* | 4/2003 | Robertson et al. | 455/416 |

OTHER PUBLICATIONS

The Three in One Phone The Official Bluetooth Website www.bluetooth.com/bluetoothguide/models/two_in_one.asp.
The Ultimate Headset The Official Bluetooth Website www.bluetooth.com/bluetoothguide/models/ultimate.asp.
The Internet Bridge The Official Bluetooth Website www.bluetooth.com/bluetoothguide/model/internet.asp.
The Interactive Conference The Official Bluetooth Website www.bluetooth . . . uetoothguide/models/interactive/asp.
Short range radio based ad-hoc networking: performance and properties Abbreviated Journal Title: 1999 IEEE International Conference on Communication (Cat. No. 99CH36311) vol. 3 1999, ISBN-0 7803 5284 X.

* cited by examiner

*Primary Examiner*—Gerald Gauthier
(74) *Attorney, Agent, or Firm*—Ross F. Hunt, Jr.; Stites & Harbison PLLC

(57) ABSTRACT

A cellular telephone having a transceiver for making cellular telephone calls is equipped with a second transceiver for establishing communication with other devices having similar capabilities. The cellular telephone uses the second transceiver to establish a local voice channel with another communication device, and combines it with a cellular call to create a multiparty conference call. A mixer mixes voice from the call and local voice channel. The second transceiver implements a local area wireless protocol.

26 Claims, 4 Drawing Sheets

CELL PHONE HAVING LOCAL WIRELESS CONFERENCE CALL CAPABILITIES

FIELD OF THE INVENTION

The present invention relates to cellular telephones, and in particular to a cell phone having local wireless conference call capabilities.

BACKGROUND OF THE INVENTION

Cellular telephones, commonly referred to as cell phones have the ability to facilitate three way conference calling. Cell phones are usually on a use plan that involves charges per minute. When a call is placed between cell phones, each phone incurs a per minute charge. When a third cell phone is added to form a three way conference call, the cell phone adding the third cell phone is charged additional minutes, and the third cell phone is also charged minutes, essentially doubling the cost, while only adding one cell phone. In other words, there are four charges for minutes accumulating for a three way call as opposed to only two charges for minutes for a call between two cell phones. In addition, cellular telephone plans commonly limit the number of callers to three in a conference call.

SUMMARY OF THE INVENTION

A cellular telephone having a transceiver for making cellular telephone calls is equipped with a second transceiver for establishing communication with other devices having similar capabilities. The cellular telephone uses the second transceiver to establish a local voice channel with another communication device, and combines it with a cellular call to create a multiparty conference call.

In one embodiment, the cellular telephone comprises a mixer to mix voice from the call and local voice channel. The second transceiver implements at least one of many protocols, including RF wireless protocols such as Bluetooth, IR protocols and other line of sight communication protocols, including analog wireless methods.

The cellular telephone also has an input device for selecting transceivers and identifying parties, and a microphone and a speaker coupled to the mixer. In a further embodiment, the second transceiver automatically identifies other compatible transceivers within range for potential voice channel establishment.

DETAILED DESCRIPTION OF THE INVENTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limiting sense, and the scope of the present invention is defined by the appended claims.

Figure 1:
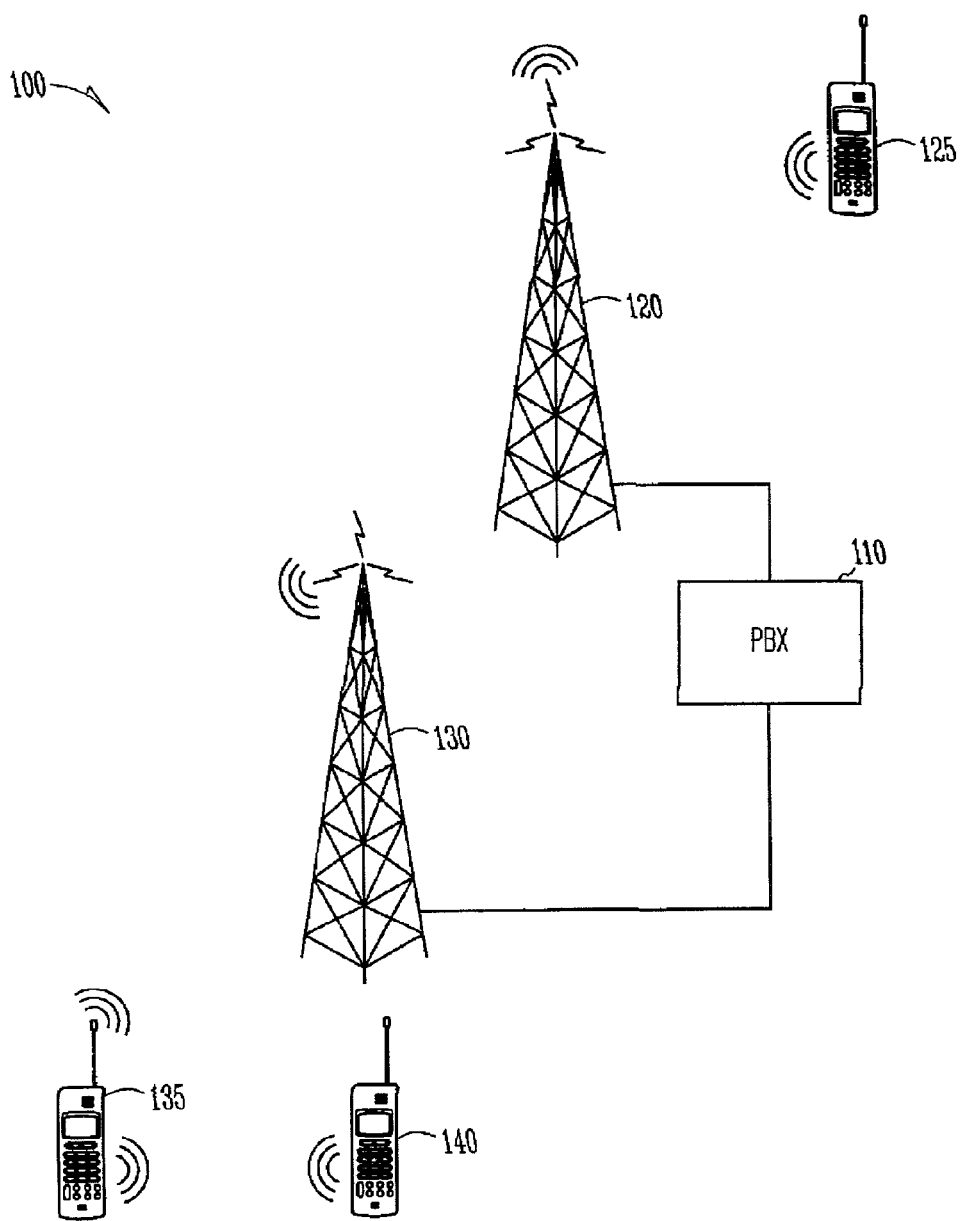
FIG. 1 is a block representation illustrating operation of the present invention.

A typical cellular communication network is depicted in block form generally at 100 in FIG. 1. The network is made up of multiple PBX boxes 110 for switching calls, multiple antennas 120 and 130, and multiple cellular telephones 125 and 135 that communicate to each other through the antennas and PBX boxes in a known manner. There are several different communication protocols used to transmit and receive voice signals between the cellular phones and the antennas. Some cellular phones utilize more than one such protocol, such as an analog and multiple digital protocols. Each cellular phone has one or more cellular transceivers for transmitting and receiving the voice signals.

In the embodiment of the invention shown in FIG. 1, cell phone 135 has an additional transceiver therein for establishing communications with a local device separate from the cellular phone network. This additional, or local transceiver does not utilize the cellular phone network, but instead relies upon a local area communication protocol, such as Bluetooth, IR, RF, or other wireless local communication protocol. The local transceiver is used to establish a voice channel with a further device 140 having a compatible local transceiver. The further device 140 is a cellular phone in one embodiment, or a personal digital appliance, computer system, radio, or other device capable of utilizing a local transceiver to transmit and receive voice communications.

In operation, cell phone 135 establishes a cellular telephone call via the cellular network to cell phone 125. This is done in a normal manner, by sending a phone number identifying cell phone 125, and establishing the call when cell phone 125 accepts the call. When the call is established, the second transceiver is used by cell phone 135 to establish a voice channel with device 140. Once this voice channel is established, the sound from both the cellular call, and the voice channel are mixed and provided to each transceiver for transmission. In essence, a multiparty conference call has been initiated by a cellular phone without incurring additional toll charges with the addition of a third party.

Figure 2:
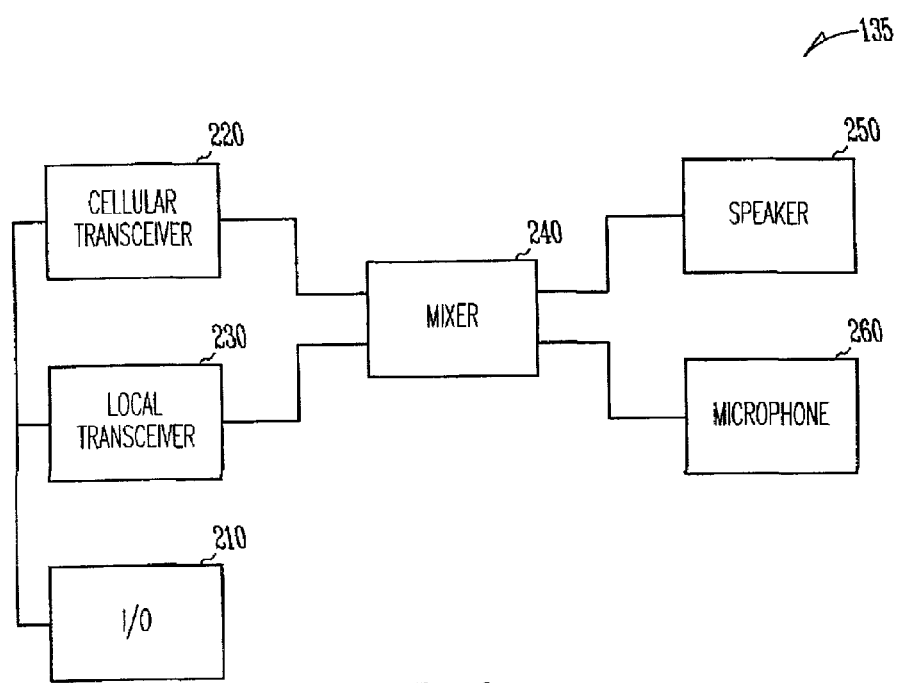
FIG. 2 is a block representation of a cellular telephone implementing the present invention.

FIG. 2 is a block diagram of a cellular telephone 135 implementing the present invention. An I/O and controller device 210 comprises standard keys found on a cellular telephone and a multi-line display for providing information such as caller ID information, and menu selection choices. Additional keys are provided in one embodiment for functions specific to establishing the voice channel using the local transceiver, or such functions are accessible through menu navigation. In still further embodiments, voice activation is used to access such functions. Device 210 also comprises a software driven controller for controlling functions of the cellular telephone.

Device 210 is coupled to a cellular transceiver 220 and a local transceiver 230, which operate under control of the device. As indicated above, the cellular transceiver is used to send signals to and from a remote cellular antenna to establish a cellular telephone call. The local transceiver is used to establish a local voice channel with a nearby second device similarly equipped with a local transceiver. The transceivers are both coupled to a mixer 240, which is either a software based mixer, hardware, or combination of software and hardware. In one embodiment, a software for mixing voice from both transceivers is executed on a processor that is located in device 210, or some other device on a circuit board within the cellular telephone. Mixer 240 is coupled to a local speaker 250 and microphone 260 for use by a user of the cellular telephone 135. Sounds such as voice, generated by the user of the cellular telephone 135 are mixed with sounds from the other devices and transmitted to such devices, as well as speaker 250 for the user of cellular telephone 135. In one embodiment, the sound generated by one device is not fed back to the speaker of that device. In other words, mixer 240 does not mix sound generated at microphone 260 and play such sound at speaker 250. In further embodiments, sound or voice generated by a user is optionally modified or not modified and fed back to the user through the corresponding speaker if desired.

Local transceiver 230 is capable of establishing multiple local voice channels if desired. Local transceiver 230 implements a communication protocol selected from the group consisting of RF, IR and microwave based communication protocols, or yet further wireless communication protocols. Depending on the protocol implemented, other nearby devices join in on the same voice channel, or a different voice channel to create a conference call involving more that three people, and including a cellular telephone call. Mixer 240 is designed to mix multiple channels in a known manner.

The local transceiver as controlled by device 210 automatically identifies other compatible transceivers within range for potential voice channel establishment in one embodiment. In one embodiment, the local transceiver 230 broadcasts a request for each suitable device within range to identify themselves. The user of the cellular telephone then selects the user from a list on the display of the telephone.

In further embodiments, an identifying code is provided by a user of another local device, and the other local device is asked to join in the conference. Upon acceptance by the other local device, a multiparty conference call is established. It should be noted that the order in which parties are added to a conference call is variable. The local voice channel is established prior to a cellular call in one embodiment.

Figure 3:
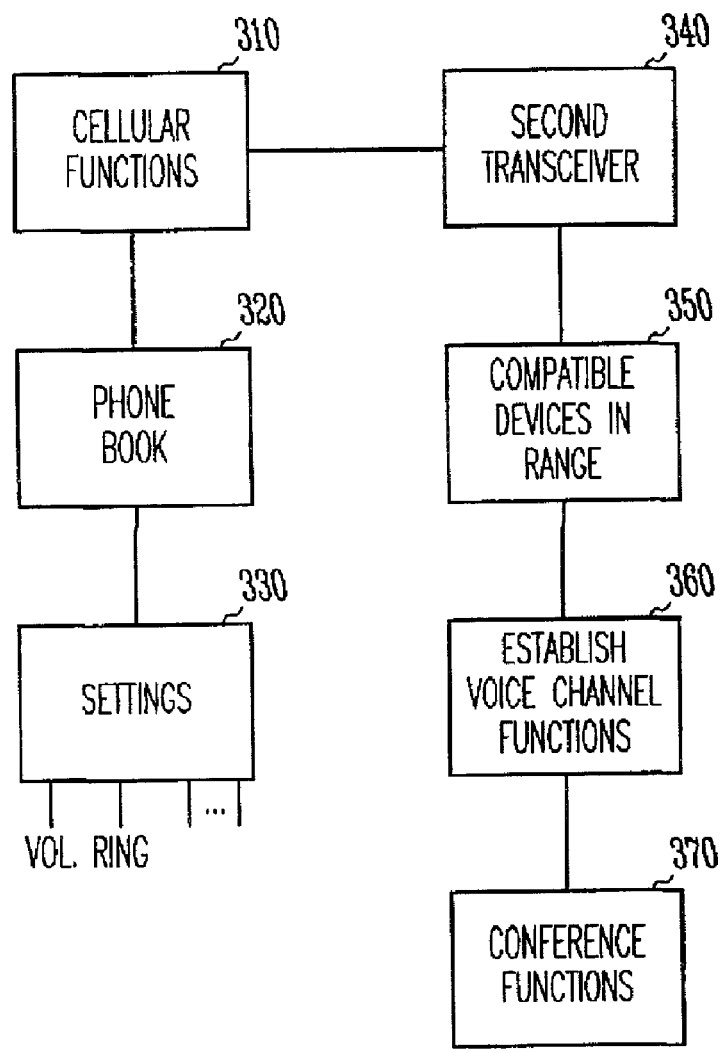
FIG. 3 is a block representation of menu functions available in a user interface of the cellular telephone of FIG. 2.

Device 210 also contains software for generating a menu driven user interface for display on the display of the cellular telephone. A block diagram representative of such functions is provided in FIG. 3. Cellular call functions are provided at one level of the menu as indicated at 310. Such functions need not be modified from those commonly associated with cellular telephones, and commonly include the ability to initiate cellular telephone calls, although initiation of such calls is usually accomplished by pressing numbered keys and a send key. A phone book set of functions 320 is also provided, along with a settings set of functions. The number of such functions in nested menus is unlimited, and the blocks are not intended to specify any order or relationship between such functions.

Sets of functions for use of the second transceiver are represented by and under block 340. Again, the functions comprise sets of nested functions in one embodiment. A menu is provided in one embodiment at 350 identifying compatible devices within range. Identification codes of such devices are preprogrammed into the cellular telephone in one embodiment, with the user of the phone associating a name of a person with each device. In further embodiments, a function provides the ability for the user to enter in a code for a user, or receive a request from another user to initiate a voice channel. Such functions are represented by block 360. Also included are menus for adding voice channels and cellular calls into a conference. The menu provides a list of potential callers to add, and provides the ability to select desired callers in one embodiment. In another embodiment, standard keys on the telephone are used in the same manner as normally used on cellular telephones to add parties to the call.

Figure 4:
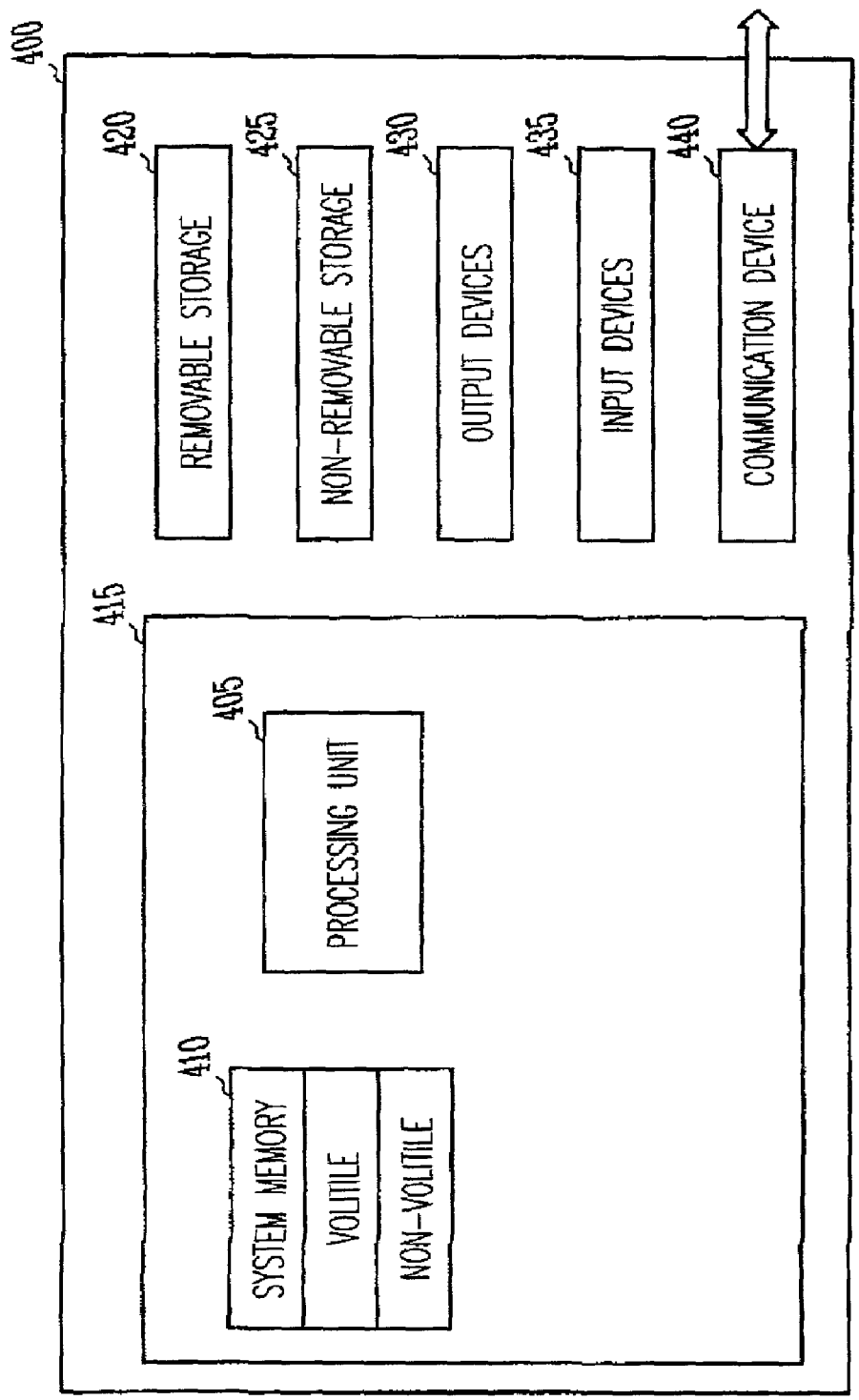
FIG. 4 is block diagram of a system for implementing the functions of the present invention.

Device 220 in one embodiment is essentially a computer system 400 as identified in a simplified block diagram of FIG. 4. The further devices are also based on the same architecture in one embodiment. In further embodiments, device 220 and further devices 140 are formed with firmware or hardware based controllers.

Computer system 400 comprises a system board 415 having a memory device 410 on which programs are stored, for execution on a processing unit 405. The memory 410 comprises system memory, volatile memory and non-volatile memory. Processing unit 405 comprises a standard processor commonly used in personal computers, or other type of firmware or hardware. Computer system 400 further comprises removable storage 420, non-removable storage 425, output devices 430 and input devices 435, corresponding to the display and keyboard of the cellular telephone, and communication devices 440, corresponding to the transceivers. As can be seen, the simplified architecture of the cellular telephone is very similar to that of a computer system in one embodiment. As previously indicated, the cellular telephone is simplified further by having just non-volatile memory from which a processor executes specialized code to control the functions of the cellular telephone.

The I/O and controller device 220 performs several functions as identified above. Such functions are implemented in software in one embodiment, where the software comprises computer executable instructions stored on computer readable media such as memory 410 or storage devices 420 and 425. The term "computer readable media" is also used to represent carrier waves on which the software is transmitted.

What is claimed is:

1. A cellular telephone comprising:
   a first transceiver for establishing cellular telephone calls;
   a second transceiver for establishing a local voice channel;
   a mixer for combining voice corresponding to the cellular telephone call with voice on the local voice channel to create a multiparty conference call,
   a menu identifying compatible devices within range of said second transceiver; and
   a menu driven interface driven by said menu for controlling establishment of voice channels by said second transceiver;
   identification codes for each of said compatible devices being preprogrammed into the cellular telephone so as to enable a name of a person to be associated with each said compatible device, and the cellular telephone further comprising a microphone and speaker coupled to the mixer such that sound generated at the microphone is not played at the speaker.

2. The cellular telephone of claim 1 and further comprising an input device for selecting transceivers and identifying parties.

3. The cellular telephone of claim 1 wherein the second transceiver implements a wireless communication protocol to establish a local voice channel.

4. The cellular telephone of claim 1 wherein the second transceiver automatically identifies other compatible transceivers within range for potential voice channel establishment.

5. The cellular telephone of claim 1 wherein the second transceiver receives requests from other devices to establish a voice channel.

6. The cellular telephone of claim 1 wherein the voice channel is established with device having a compatible transceiver, wherein the device is selected from the group consisting of cellular telephones, two way radios, personal digital assistants, internet appliances and computer systems.

7. The cellular telephone of claim 1 wherein the mixer comprises executing software.

8. The cellular telephone of claim 1 further comprising a function enabling entry of a code for each person.

9. The cellular telephone of claim 1 wherein the menu includes a list of potential callers to be added to the conference call.

10. The cellular telephone of claim 9 further comprising a function for selecting desired callers from said list.

11. A method of conferencing a third party into a cellular telephone call taking place using a first transceiver, the method comprising:
   using a second transceiver in the cellular phone to broadcast a request for compatible third party devices within a desired local area to identify themselves;
   generating a list of the third party devices responding to the request;
   selecting of at least one third party device from the list;
   establishing a voice channel with the at least one third party device selected, via the second transceiver in the cellular phone;
   mixing voice from the voice channel and the cellular telephone call to establish a multiparty conference call; and
   using a menu driven interface, driven by a menu comprising the list identifying compatible devices within range of said second transceiver, in controlling establishing of voice channels.

12. The method of claim 11 and further comprising establishing further voice channels with further third parties, and mixing voice from the multiple voice channels.

13. The method of claim 11 wherein the at least one third party device is invited to establish a voice channel prior to its establishment.

14. The method of claim 13 wherein the voice channel is established after acceptance by the at least one third party device.

15. The method of claim 11 wherein the cellular phone is invited to establish the voice channel with the third party device.

16. The method of claim 11 and further comprising detecting third party devices within range of the second transceiver.

17. A method of creating a multiparty conference call using a cellular phone including a local area receiver, the method comprising:
   identifying a third party device within a desired local area based on a menu identifying compatible third party devices within range of the local area receiver, and based on identification codes for each of said compatible third party devices preprogrammed into the cellular phone so as to enable a name of a person to be associated with each compatible third party device or by;
   establishing a voice channel with the third party device via the local area transceiver in the cellular phone that is a party to a cellular telephone call; and
   mixing voice from the voice channel and the cellular telephone call to establish a multiparty conference call; and
   controlling the establishing of further voice channels using a menu driven interface driven by the menu identifying compatible third party devices within range of the local area transceiver,
   said method further comprising identifying further compatible third party devices by broadcasting a request for compatible third party devices within the range of the local area receiver to identify themselves and adding to the menu third party devices responding to the request.

18. The method of claim 17 wherein the cellular phone is invited to establish the voice channel with the third party device.

19. An apparatus, comprising:
   a housing;
   means, disposed within said housing, for communicating with a first device via a cellular communications network;
   means, disposed within the said housing, for communicating with a second device via a local communications link;
   combining means, disposed within said housing, for combining communications with the first and second devices wherein a user of the first device is capable of communicating with a user of the second device;
   a microphone coupled to said combining means;
   a speaker coupled to said combining means such that sound generated at the microphone is not played at the speaker;
   a menu identifying compatible devices within range of said second transceiver; and
   a menu driven interface driven by said menu for controlling establishment of voice channels,
   wherein the apparatus identifies further compatible third devices by broadcasting a request for compatible third party devices within the range of the local area receiver to identify themselves and adds to the menu those third party devices responding to the request.

20. An apparatus as claimed in claim 19, said means for communicating with a first device via a cellular communications network comprising a cellular telephone transceiver circuit structure.

21. An apparatus as claimed in claim 19, said means for combining communications with the first and second devices comprising a mixer circuit structure.

22. An apparatus as claimed in claim 19, said means for combining communications with the first and second devices comprising a mixer circuit structure.

23. The apparatus of claim 19 wherein the apparatus comprises a cellular telephone, and identification codes for further compatible devices are preprogrammed into the cellular telephone so as to enable a name of a person to be associated with each said further compatible device.

24. The apparatus of claim 23 further comprising a function enabling entry of a code for each person.

25. The apparatus of claim 19 wherein the menu includes a list of potential callers to be added to the conference call.

26. The apparatus of claim 25 further comprising a function for selecting desired callers from said list.

* * * * *